United States Patent
Bayeh et al.

[19]

[11] Patent Number: 6,012,098

[45] Date of Patent: Jan. 4, 2000

[54] SERVLET PAIRING FOR ISOLATION OF THE RETRIEVAL AND RENDERING OF DATA

[75] Inventors: Elias N. Bayeh, Cary; Mark W. Lumsden, Apex, both of N.C.

[73] Assignee: International Business Machines Corp., Armonk, N.Y.

[21] Appl. No.: 09/027,768

[22] Filed: Feb. 23, 1998

[51] Int. Cl.[7] .................................................. G06F 13/00
[52] U.S. Cl. ..................... 709/246; 709/200; 709/203; 709/217; 709/219
[58] Field of Search ............................ 709/1, 100, 101, 709/107, 200, 203, 217, 219, 246

[56] References Cited

U.S. PATENT DOCUMENTS

| | | | |
|---|---|---|---|
| 5,828,840 | 10/1998 | Cowan et al. | 709/203 |
| 5,908,469 | 6/1999 | Botz et al. | 713/201 |
| 5,924,116 | 7/1999 | Aggarwal et al. | 711/122 |
| 5,928,323 | 7/1999 | Gosling et al. | 709/203 |
| 5,935,249 | 8/1999 | Stern et al. | 713/201 |

*Primary Examiner*—Zarni Maung
*Assistant Examiner*—Saleh Najjar
*Attorney, Agent, or Firm*—Gregory M. Doudnikoff

[57] ABSTRACT

A technique, system, and computer program for using servlets to isolate the retrieval of data from the rendering of the data into a presentation format. Data retrieval logic is isolated to a data servlet, and presentation formatting is isolated to a rendering servlet. Servlet chaining is used to send the output of the data servlet to the rendering servlet. The data servlet formats its output data stream for transfer to a downstream servlet. This data stream may be formatted using a language such as the Extensible Markup Language (XML), according to a specific Document Type Definition (DTD). The rendering servlet parses this XML data stream, using a style sheet that may be written using the Extensible Style Language (XSL), and creates a HyperText Markup Language (HTML) data stream as output.

23 Claims, 5 Drawing Sheets

SERVLET PAIRING FOR ISOLATION OF THE RETRIEVAL AND RENDERING OF DATA

BACKGROUND OF THE INVENTION

1. Field of the Invention

The present invention relates to information presentation in a computer system, and deals more particularly with a technique, system, and computer program for using servlets to isolate the retrieval of data from the rendering of the data into a presentation format.

2. Description of the Related Art

As the science of computer programming has evolved over the past several decades, one of the principles that has developed from experience is that it is good programming practice to isolate the code that implements data retrieval from the code that renders that retrieved data into a presentation format. The advantage of this type of code structuring became apparent when software applications began to be used internationally, and it was necessary to present retrieved data in more than one language. The messages, headings, and other types of textual information presented by the computer program needed to be in the language of the user of that program. If the text was not originally created in a language understood by the user, then translation into another language was required. By isolating textual information from the code required for presentating that text to the user (whether by displaying it on a screen, printing it on paper, or other means), the task of locating the textual information, in order to translate it, was simplified.

This manner of isolating code which performs one function from code that performs a different function has become standard practice as structured programming came into common usage. Not only does the isolation make location of the relevant code easier, but it also makes changes easier (because locating the code to be changed is often a significant part of the change effort), and it makes changes less error-prone (because it is more likely that all the code needing change will be located, and will therefore be changed).

When code for presenting information to the user is properly isolated, ease of translation into other languages is only one benefit. It also becomes much easier to adapt the information for presentation on different types of media. For example, computer display screens were once limited to presenting text, where that text was limited by the constraints of the display screen to a matrix of 80 characters in each of 24 lines. The display screens in common usage today do not have such constraints, and support display of text, graphics, video, etc.—where the matrix has effectively expanded to tens of thousands of tiny display elements. While not all changes in media are this dramatic, similar issues arise if changes are made to the manner in which data formatting instructions are represented. If the definition of the formatting instructions is revised or enhanced, the logic implementing those formatting instructions may need to be changed to align it with the new definition. When presentation formatting logic has been isolated, the task of adapting to presentation in an alternative environment, or formatting using different instructions, becomes much simpler.

Today, hundreds of software applications are being written for use on the Internet. The Internet is a vast collection of computing resources, interconnected as a network, from sites around the world. The Internet has had a fairly short life span thus far, having originated some twenty years ago and only recently coming into everyday use by millions of people throughout the world. As computer programmers rush to provide software applications for use on the Internet, often in newly-developed programming languages written for the specific needs of the Internet, some of the lessons of the past are overlooked.

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The present invention deals with using the search and browse capabilities, whereby the user requests to see information from the Internet, and that information is presented on the display screen of the user's computer.

The user will have software running on his computer to allow him to make search requests, and to see the search results. These functions are typically combined in what is referred to as a "Web browser", or "browser". After the user has created a search request using the browser, a message is sent out into the Internet to carry out the request. The target of the request message is one of the interconnected computers in the Internet network. That computer will receive the message, attempt to find the data satisfying the user's request, format that data for display with the user's browser, and return the formatted information to the browser software running on the user's computer.

This is an example of a client-server model of computing, where the machine at which the user requests information is referred to as the client, and the computer that locates the information and returns it to the client is the server. When this scenario is implemented using the Internet, the browser running on the client's machine accepts the data it will display in response to the user's request, by convention, as a data stream formatted using the HyperText Markup Language ("HTML"). The phrase "data stream", when used herein, is to be construed as applying equally to data received as if it were an incoming stream (for example, from an input buffer) and to data that has been received in this manner and stored in a file. HTML is a standardized notation for displaying text and graphics on a computer display screen, as well as providing more complex information presentation such as animated video, sound, etc. Because browsers expect an incoming response to be formatted using HTML, servers generate their response in that format. This represents a step backward in programming methodology, however, as it condones a lack of separation between the logic involved in accessing and processing data, and the logic implementing the knowledge of how the data is to be formatted for user display and interaction. If changes are made to the HTML notation, the server code must be revised to support the changes. If changes are made to media, the presentation formatting logic may need to be revised to adapt to those media changes. It would be easier to locate and change the necessary code if that code had been implemented in a modular fashion, whereby the data retrieval logic was isolated from the data presentation formatting logic. This type of code isolation would also allow complete replacement of the presentation formatting logic (for example, if a different presentation formatting notation replaced HTML), without disruption of the code implementing the data retrieval logic.

Accordingly, a need exists for a technique by which information retrieval logic can be isolated from information presentation formatting logic. Further, a need exists for a system and method by which this isolation technique allows efficient use of multiple components for information retrieval, as well as multiple components for information formatting. The multiple components may implement similar manners of data retrieval and formatting, respectively, or they may implement alternative manners of retrieval and formatting. The proposed technique provides the required logic isolation in a way that enables different retrieval or formatting implementations to be quickly and easily substituted into the computing environment, as may be needed to adapt to changes in retrieval or formatting requirements. Further, the proposed technique enables additional data retrieval or formatting implementations to be quickly and easily added into the computing environment, which will provide greater flexibility in the manner in which data can be presented, and which may also increase overall system throughput and alleviate potential processing bottlenecks. The isolation technique should be provided using widely-accepted programming techniques and data formatting notations, in order to increase industry acceptance and maximize the advantages of the present invention.

SUMMARY OF THE INVENTION

An object of the present invention is to provide a technique whereby information retrieval logic can be isolated from information presentation formatting logic.

Another object of the present invention is to provide a technique whereby this isolation technique allows efficient use of multiple components for information retrieval, as well as multiple components for information formatting. The multiple components may implement similar manners of data retrieval and formatting, respectively, or they may implement alternative manners of retrieval and formatting.

It is another object of the present invention to provide the required logic isolation in a way that enables different retrieval or formatting implementations to be quickly and easily substituted into the computing environment, to adapt to changes in retrieval or formatting requirements.

If is a further object of the present invention to provide a technique that enables additional data retrieval or formatting implementations to be quickly and easily added into the computing environment, providing greater flexibility in the manner in which data can be presented, and possible increasing overall system throughput and alleviating potential processing bottlenecks as well.

Still another object of the present invention is to provide an isolation technique which uses widely-accepted programming techniques and data formatting notations, in order to increase industry acceptance and maximize the advantages of the present invention.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process for use in a computing environment having a connection to a network, for using servlets to isolate data retrieval from data presentation formatting, comprising: (1) a client request; (2) one or more data servlets, each comprising: a subprocess for receiving the client request; a subprocess for using the client request to retrieve data from a database; and a subprocess for formatting the retrieved data into a first data stream; and (3) one or more rendering servlets, each comprising: a subprocess for receiving the first data stream, responsive to a subprocess in any of the data servlets for sending the first data stream to one of the rendering servlets; a subprocess for parsing the received first data stream; a subprocess for formatting the parsed data into a second data stream; and a subprocess for returning the second data stream as a response to the client request. Preferably, the first data stream is formatted as an Extensible Markup Language (XML) data stream, the second data stream is formatted as a HyperText Markup Language (HTML) data stream, and the subprocess for formatting the parsed data uses a style sheet. As examples, the style sheet may be an Extensible Style Language (XSL) style sheet, or a Cascading Style Sheet (CSS). The subprocess for sending said first data stream may be implemented using servlet chaining, and the servlets may be Java servlets.

Additionally, the present invention provides a system for use in a computing environment having a connection to a network, for using servlets to isolate data retrieval from data presentation formatting, comprising: (1) a client request; (2) one or more data servlets, each comprising: means for receiving the client request; means for using the client request to retrieve data from a database; and means for formatting the retrieved data into a first data stream; and (3) one or more rendering servlets, each comprising: means for receiving the first data stream, responsive to means in any of the data servlets for sending the first data stream to one of the rendering servlets; means for parsing the received first data stream; means for formatting the parsed data into a second data stream; and means for returning the second data stream as a response to the client request. Preferably, the means for formatting the first data stream formats it as an Extensible Markup Language (XML) data stream, the means for formatting the second data stream formats it as a HyperText Markup Language (HTML) data stream, and the means for formatting the parsed data uses a style sheet. As examples, the style sheet may be an Extensible Style Language (XSL) style sheet, or it may be a Cascading Style Sheet (CSS). The means for sending the first data stream may be implemented using servlet chaining, and the servlets may be Java servlets.

Additionally, the present invention provides a method for using servlets to isolate data retrieval from data presentation formatting in a computing environment having a connection to a network, comprising the steps of receiving a client request at a first of one or more data servlets; retrieving data from a database, using the client request; formatting the retrieved data into a first data stream; sending the first data stream from the first data servlet to a first of one or more rendering servlets; receiving the first data stream at that first rendering servlet; parsing the received first data stream; formatting the parsed data into a second data stream; and returning the second data stream as a response to the client request. Preferably, the step for formatting the first data stream formats it as an Extensible Markup Language (XML) data stream, the step for formatting the second data stream formats it as a HyperText Markup Language (HTML) data stream, and the step for formatting the parsed data uses a style sheet. As examples, the style sheet may be an Extensible Style Language (XSL) style sheet, or a Cascading Style Sheet (CSS). The step for sending the first data stream may be implemented using servlet chaining, and the servlets may be Java servlets.

The present invention will now be described with reference to the following drawings, in which like reference numbers denote the same element throughout.

DESCRIPTION OF THE PREFERRED EMBODIMENT

Figure 1:
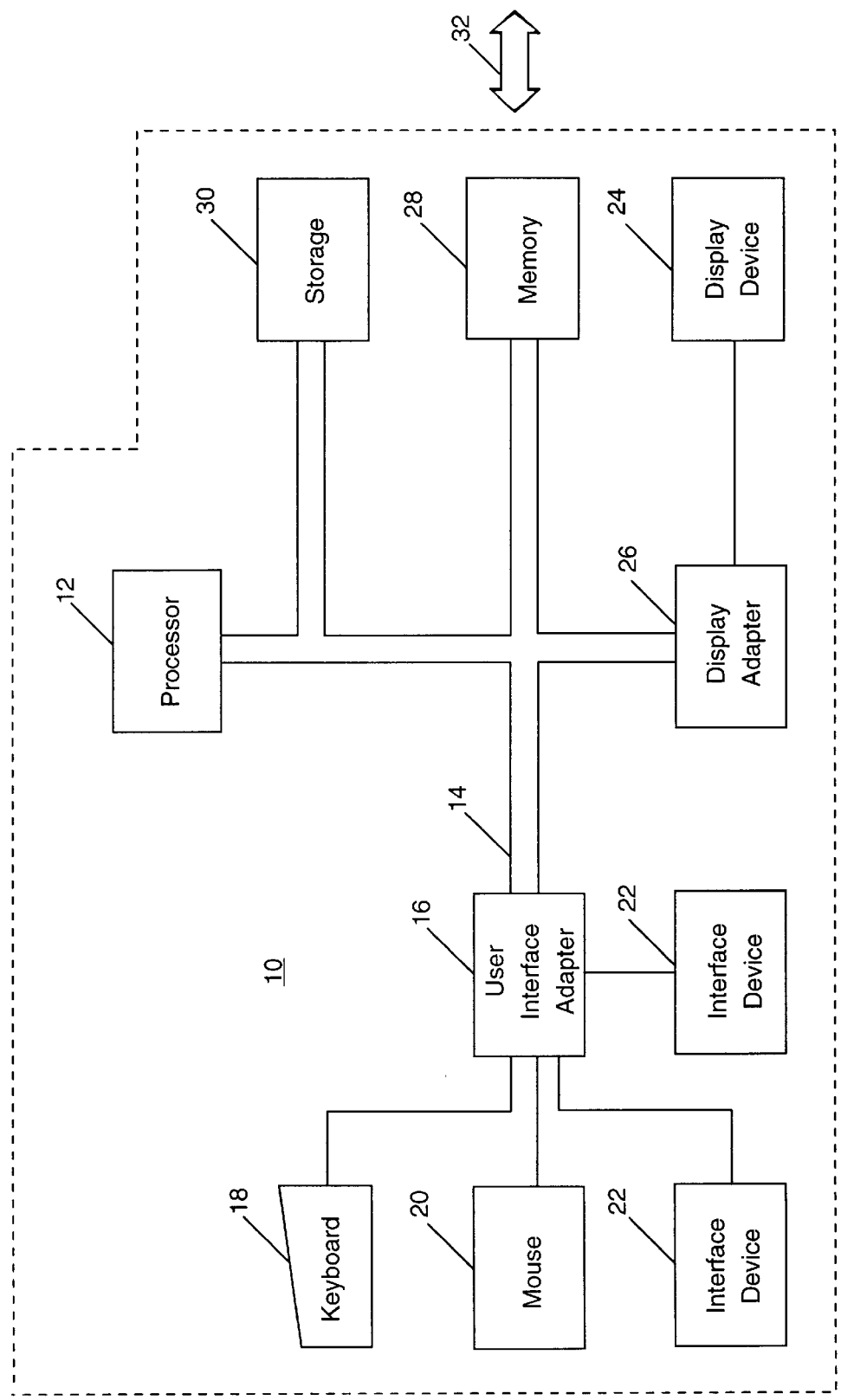
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
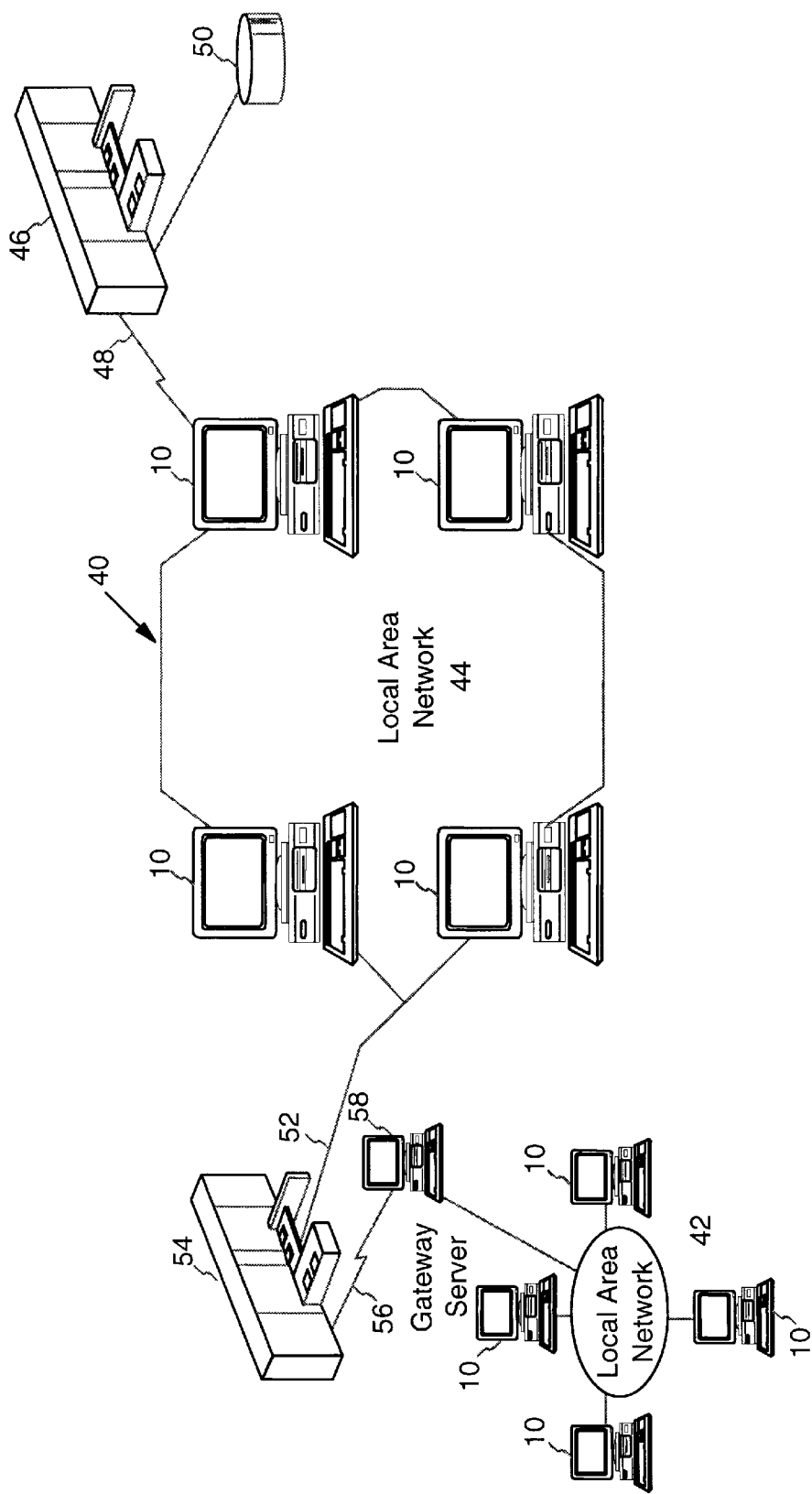
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The data stream resulting from use of the present invention may be stored on any of the various media types used by the long-term storage 30, or may be sent from the workstation 10 to another computer or workstation of the network illustrated in FIG. 2 over the communications channel 32, for storage by that other computer or workstation.

The preferred embodiment of the present invention will now be discussed with reference to FIGS. 3 through 5.

In the preferred embodiment, the present invention is implemented as more than one computer software program. These programs will be used where software applications retrieve data in response to a user's request, optionally perform some type of processing on the retrieved data, and format the data that is to be returned to the user for display. According to the present invention, one program will be responsible for data retrieval, and another program will be responsible for data formatting. (Processing of the data after retrieval, such as computing sums of retrieved numbers, does not form a part of the present invention, and will not be discussed herein.) Preferably, the programs are implemented as stand-alone code, whereby one program implements only data retrieval logic and another implements only data formatting. Alternatively, the data retrieval logic (and, equivalently, the data formatting logic) may be implemented as one or more modules (also referred to as code subroutines, or "objects" in object-oriented programming), which are incorporated along with other modules to form complete programs, where the data retrieval logic (equivalently, data formatting logic) is isolated to the one-or-more modules. The programs will typically execute on a computer functioning as a server, providing services in response to requests from a client using a Web browser connected to the Internet. Alternatively, the connection may be to a corporate intranet (that is, a network owned or managed internally to the user's company) of which the user's computer is a component, where this corporate intranet provides services in a similar manner to the Internet. Use of the term "Internet" herein, when discussing processing associated with the user's request, includes processing that occurs in an intranet, unless otherwise stated.

While the preferred embodiment of the present invention contemplates that the data retrieval logic is implemented in a different program from that implementing the data formatting logic, the two different logic functions may be implemented in a single program without deviating from the scope of the present invention. In this case, the required functional isolation may be achieved by structuring the logic into separate modules, or groups of modules, per function.

Figure 3:
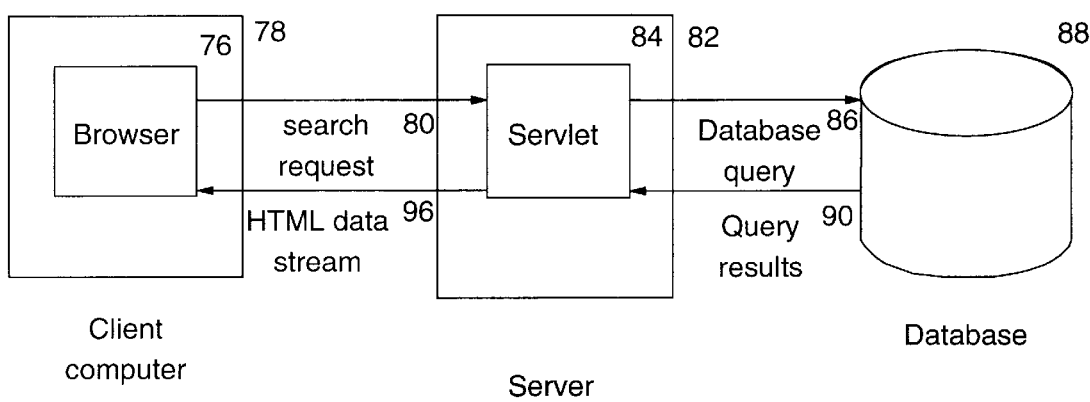
FIG. 3 illustrates a client-server model for processing a user's search request with a Web browser according to the prior art.

FIG. 3 illustrates a client-server model for processing a user's search request with a Web browser according to the prior art. The client software, referred to herein as a browser 76, resides on the user's client computer 78, and allows the user to create a search request 80 and send that request into the Internet for processing.

The search request 80 reaches a server 82 capable of fulfilling the search request. The manner in which the appropriate server 82 is located, and the manner in which the search request 80 reaches it, are well known in the art and will not be discussed in detail herein. The servers pertinent to the present invention have one or more "servlets" 84 running on the server machine. A servlet is a program typically written in the Java object-oriented programming language. (Java is a trademark of Sun Microsystems, Inc.) A servlet is created in a way that allows it to be easily added to the code already running on a server, and is intended to extend the functionality provided by the server. A servlet typically implements code to perform a specific task, such as retrieving information from a particular type of database.

The programming model implemented in existing servlets 84 is to receive the search request 80, query a database 88 using database query statements 86 appropriate to the particular database, receive the query results 90, and format the results into an HTML data stream 96. This HTML data stream is then sent back to the client computer 78, where the browser 76 processes the HTML to display the formatted results to the user. (It is possible that the query results may be further processed before creating the HTML data stream. However, this type of processing is not relevant to the present invention.)

Figure 4:
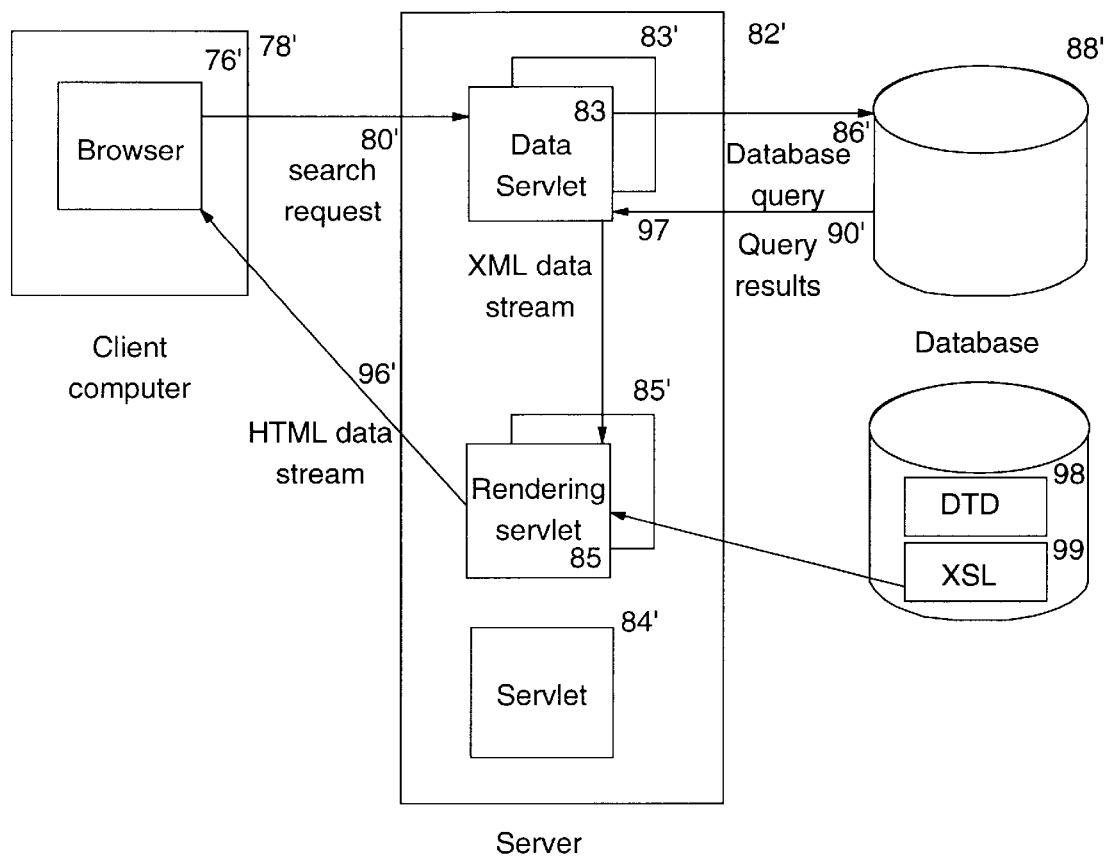
FIG. 4 illustrates a client-server model for processing a user's search request with a Web browser according to the present invention.

FIG. 4 illustrates a client-server model for processing a user's search request with a Web browser according to the present invention.

The client computer 78' again has client software, the browser 76', installed that allows the user to create a search request 80' and send that request into the Internet for processing. The search request 80' again reaches a server 82' capable of fulfilling the search request, and there are servlets 84' (as well as servlets 83 and 85) running on the server machine. However, the programming model used in FIG. 4 differs from that of FIG. 3, in order to support the isolation technique of the present invention.

In the programming model of FIG. 4, one of the types of servlet is referred to as a "data servlet" 83. The functionality of the data servlets is structured so that a data servlet retrieves data from a database. The role of the data servlet is only to retrieve data from a database 88': it does no presentation formatting of that retrieved data. The data servlet 83 receives the search request 80', queries a database 88' using database query statements 86' appropriate to the particular database, and receives the query results 90'. At that point, the data retrieval function of the data servlet 83 is complete.

Before the data servlet 83 can pass data to another servlet for further processing, it must format that data in a manner that allows the next servlet to read and correctly interpret the data. In the preferred embodiment of the present invention, the data servlet formats its output as an Extensible Markup Language ("XML") data stream 97. XML is a standardized formatting notation, created for structured document interchange on the Web. XML is widely accepted in the industry, enabling the advantages of the present invention to be maximized. When the data servlet 83 formats its output into XML, and the next downstream servlet expects its input in XML format, the XML notation functions as a conduit, enabling a smooth transfer of data from one type of servlet to the other. A Document Type Definition ("DTD") 98, which may be stored on a medium such as a disk, is used when creating the XML data stream 97.

According to the present invention, the XML data stream 97 is passed on to a "rendering servlet" 85. The function of the rendering servlet 85 is to render the data it receives into a presentation format (in other words, the rendering servlet 85 adds presentation formatting instructions to the data it receives).

By isolating the function of the rendering servlet 85 from the function of the data servlet 83, the advantages of structured, modular programming arc achieved. As discussed earlier, one of these advantages is simplifying the change process if changes are required to either the data retrieval logic (isolated in the data servlet 83), or to the data presentation formatting logic (isolated in the rendering servlet 85). Further, system throughput can be optimized by having multiple data servlets 83 and multiple rendering servlets 85: if one rendering servlet 85 is busy, the data servlet 83 does not have to wait to use the rendering services—it can simply pass the data to be rendered to a different rendering servlet 85'. This prevents bottlenecks in the system, where one process is delayed by another process. System performance is also optimized in this model, because decoupling the data retrieval logic from the presentation formatting logic allows each scrvlet to be optimized in its functionality. For example, a unique data servlet 83' might be created to retrieve data from a specific type of database 88 used by the server 82. Similarly, unique rendering servlets 85 might be created to format data according to different presentation requirements. When a servlet is written to retrieve data from a specific, known database (equivalently, to format data for a specific, known environment), the servlet code can be optimized for that use. Additionally, system flexibility is optimized because the unique servlets can function as pluggable components, which come and go as the needs of the environment change.

A rendering servlet 85 receives data in a predefined format. XML is used in the preferred embodiment, to align with the format created by the data seivlet 83. A rendering servlet 85 uses two types of input, according to the preferred embodiment of the present invention. The first type of input is the data representing the query results 90' for the user's search request 80', formatted as an XML data stream 97 by the data servlet 83, as discussed above. The second type of input to the rendering servlet 85 is an Extensible Style Language ("XSL") style sheet 99. An XSL style sheet describes how XML information is to be presented as HTML. Using these two inputs, the rendering servlet 85 creates an HTML data stream 96'. This HTML data stream 96' represents similar content as the HTML data stream 96 of the prior art, and thus the information sent back to the client computer 78', and processed by the browser 76', is nearly identical to that in the prior art model of FIG. 3. (Different formatting information may be included in the HTML data stream 96', because the existing art does not use XSL style sheets. However, this formatting information is still represented in the HTML notation of the prior art.) Because the data stream 96' received by the browser 76' uses the same formatting instructions supported by existing browser implementations, the processing model defined for the present invention minimizes the extent of disruption to existing software by localizing all changes to code running on servers. This minimized disruption further maximizes the advantages of the preferred embodiment.

While the preferred embodiment uses an XSL style sheet, other style sheets may be used instead of, or in addition to, XSL without deviating from the inventive concepts of the present invention. For example, Cascading Style Sheets ("CSS"), may be used.

The technique of sending a data stream from one servlet to another servlet is implemented in the preferred embodiment using "servlet chaining". Servlet chaining is a technique which is known in the art, enabling the output of one servlet to be the input to a next logical servlet. A servlet chain may consist of m servlets, where servlet 1 receives the client request, the output of each intermediate servlet n (where n<m) is the input to servlet (n+1), and the output of servlet m is sent to the client as the final result of the server's processing of the client request. When a servlet chain is to be used for processing a client request, there are two ways currently known in the art to trigger the chained processing: (1) "servlet aliasing" or (2) Mime types. Either technique can be used to implement the present invention. (Depending on the particular application of the present invention, one technique may perform better than the other. However, such optimization does not form a part of this invention.)

Servlet aliasing is a technique whereby a list of servlets is predefined, with the identifying name of each servlet specified in a comma-separated list, in the order in which the servlets are to be invoked. The name of the data servlet would typically be the first-named servlet in this list, since this data servlet needs to retrieve the data satisfying the user's request. However, it is possible that some type of pre-processing of the user's request might be required, in which case the name of the servlet performing the pre-processing would appear in the comma-separated list before the name of the data servlet. The last name in the comma-separated list is the name of the rendering servlet. This comma-separated list is defined as being associated with a specific Uniform Resource Locator ("URL"), where a URL is analogous to the address of the server computer where the client request should be sent. Servlet aliasing is known in the art, as are techniques for creating the comma-separated list.

Mime is an abbreviation for Multipurpose Internet Mail Extensions, and refers to a standardized method of allowing multiple types of data to be intermixed in data streams. A mime type is used to identify what type of data is contained in the data stream. A configuration file identifies particular mime types with the name of the executable process to be invoked when a data stream having that mime type is received. Chaining is implemented by creating an entry in the "mimeservlets.properties" file to specify the servlet name that will be invoked for a particular mime type. As each servlet in the chain creates its output stream, it associates a mime type with that output. Typically, a data servlet of the present invention will create its output with a mime type of "text/xml", and the output of the rendering servlet will have a mime type of "text/html". By associating the mime type "text/xml" with the name of a rendering servlet in the mimeservlets.properties file, the rendering servlet is automatically invoked to process the output created by the data servlet. These techniques, and the manner of implementing them, are known in the art.

Figure 5:
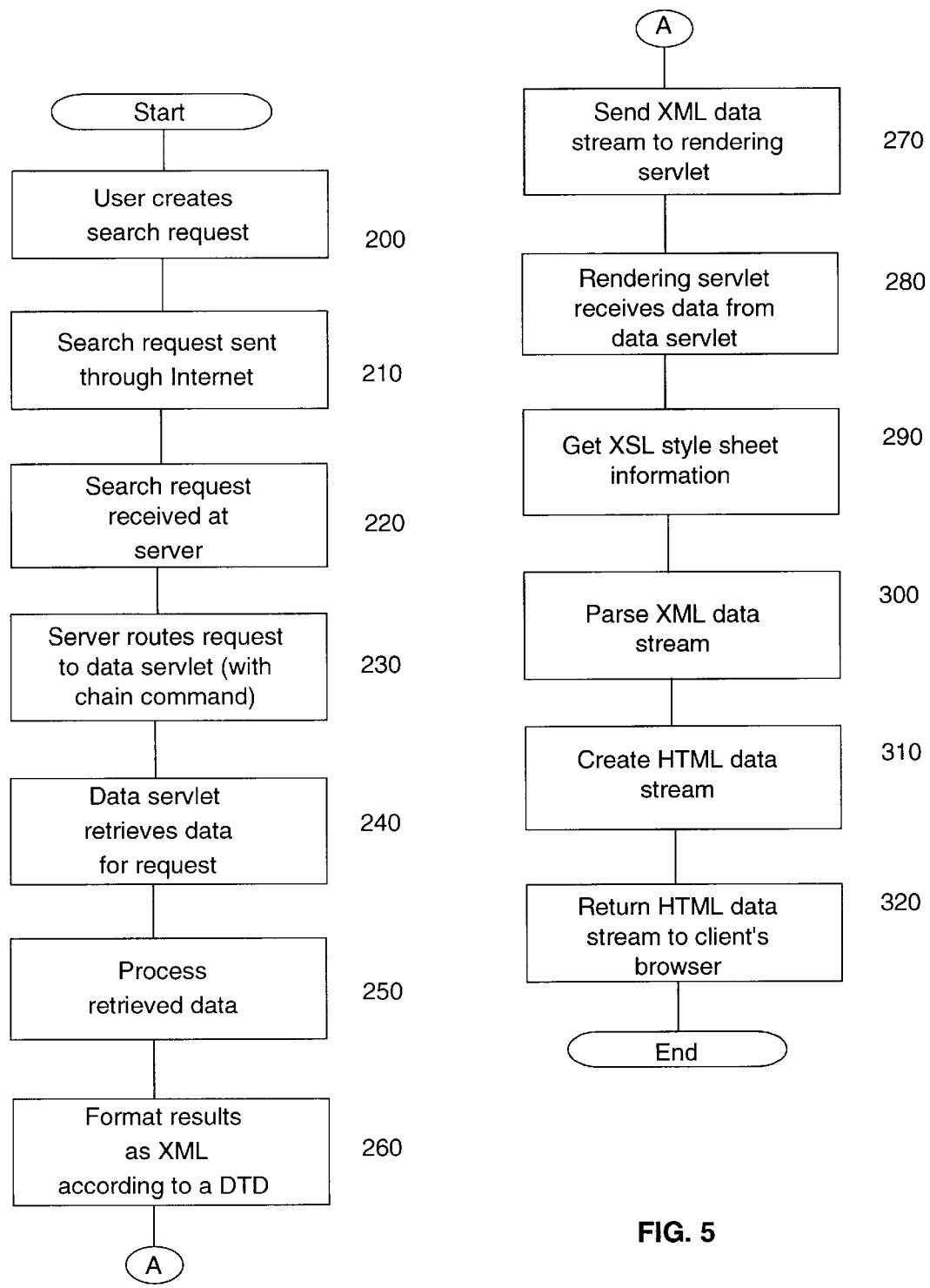
FIG. 5 illustrates a flow chart which sets forth the logic involved with the present invention.

FIG. 5 illustrates the logical steps performed when the present invention is used to process a client search request.

The process begins at Step 200, when the user creates a search request using the facilities of his browser software. At Step 210, the search request is sent into the Internet for processing, using the appropriate URL which the browser has created (or which the user may have typed directly) for this search request. Steps 200 and 210 use existing techniques which are known in the art. They are indicated in FIG. 5 for completeness.

Step 220 indicates that the client's request is received at the appropriate server. Again, this step uses existing techniques, and is included for completeness.

At Step 230, the server which received the client's request routes it to the proper data servlet. If servlet chaining has been implemented using servlet aliasing, then the server determines which is the proper data servlet by checking the comma-separated list which was previously defined for the URL to which the request was addressed. If servlet chaining has been implemented using mime types, then the request will have a mime type associated with it, and the mimeservlet properties file will have an entry that was previously created to specify which data servlet is to be invoked for this particular mime type.

Steps 240 through 270 are implemented by a data servlet according to the present invention. These steps represent the logic associated with data retrieval, as well as minimal formatting of the data for transfer to a rendering servlet: the formatting is not a presentation format.

At Step 240, the data servlet processes the client request. The request will typically require retrieving data from some database available to the data servlet. The data servlet will format a database query request, using an appropriate query language that will depend on the type of database on which the relevant data is stored. Database query languages are well known in the art, as are techniques for determining which language is required and how to format queries in a particular language. The creation of the query request, as well as sending the request to the database and receiving data satisfying that request, do not form part of the inventive concepts of the present invention. Techniques are used which are well known in the art.

Step 250 is included to indicate that, optionally, additional processing may be performed on the data received in response to the database query. For example, the processing might consist of counting the number of records that were received in response to the query, and formatting that sum for returning to the client along with the information from the retrieved records. Again, well known techniques are used for processing data, and the actual processing performed does not form part of the present invention.

At Step 260, the data servlet formats the database information as an XML data stream. As previously discussed, a DTD is used in this formatting step. The DTD specifies how specific predefined "tags" are to be inserted into the XML data stream. A tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to be presented on the Web page as an e-mail address; the syntax "</email>" might be inserted after the character string, to indicate where the e-mail character string ends.

When the entire XML data stream required for the database results has been formatted by the data serviet, that data stream is sent on to the next servlet in the chain at Step 270. In the preferred embodiment, the next servlet is the rendering servlet.

Steps 280 through 320 are implemented by a rendering servlet according to the present invention. These steps represent the logic associated with data presentation formatting.

Step 280 receives the XML data stream created by, and sent by, the data servlet. Techniques for receiving a data stream from a chained servlet are well known in the art, and Step 280 is shown for completeness of depicting the function of the rendering servlet.

According to the preferred embodiment, the rendering servlet must parse the XML data stream, and reformat it into HTML. This is necessary because browsers, by convention, expect to receive data that has been formatted with HTML. As discussed previously, this parsing process requires two types of data input: the XML data stream, and style sheet information. In the preferred embodiment, an XSL style sheet is used. Techniques for writing parsers are well known in the art, and will not be described in detail herein.

Step 2900 indicates that the rendering servlet locates the XSL style sheet. Typically, the style sheet will be stored as a file on a medium, such as a disk drive, accessible to the rendering servlet. Alternatively, the style sheet might be incorporated directly into the code of the rendering servlet; however, because incorporating the information directly into the code makes revising the style sheet more difficult, this alternative is less desirable than isolating the style sheet as a separate file.

At Step 300, the rendering servlet parses the XML data stream, using the input sources described above. A parser reads a data stream, looking for predefined strings of characters that the parser recognizes, and which indicate to the parser what type of data is represented. In the preferred embodiment, the DTD used in the data servlet specified predefined strings that were used as tags, as described above, and inserted into the XML data stream by the data servlet. The parser looks for these tags as it reads the XML data stream. When a recognized tag is found, the parser knows what type of XML document element appears in the data stream between this tag and its corresponding ending tag (or following this tag, if ending tags are not required). As the parser in the rendering serviet determines what each document element is, it creates a new data stream, fonnatted using HTML. The parser may also insert presentation style attributes into the HTML data stream, where the appropriate attribute to use is determined according to the type of document element the parser is currently processing. Creation of the HTML data stream is represented in FIG. 5 as Step 310, although one skilled in the art will recognize that the functions of Steps 300 and 310 are intermingled. That is, as the parser processes portions of the input XML data stream, it creates the corresponding HTML data stream, then processes another portion of the input data stream, creates more of the output data stream, etc., until the entire input data stream has been processed.

When the reformatted data stream is complete, Step 320 sends that HTML data stream back to the client's browser, to be processed by the browser for presentation to the user.

While the preferred embodiment has described a rendering servlet that processes an XML data stream using an XSL style sheet, it is also possible that other style sheets might be used with other types of data streams. In that case, a separate rendering servlet which is adapted to accepting the different data stream would be used. For example, if both XSL style sheets and CSS style sheets were to be accommodated, a rendering servlet accepting XML and using XSL would be available on the server, and a rendering servlet for CSS would also be available. The data servlet would invoke the appropriate rendering servlet depending on which style sheet language is to be used.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment having a connection to a network, computer readable code readable by a computer system in said environment, for using servlets to isolate data retrieval from data presentation formatting, comprising:

a client request;

one or more data servlets, wherein each of said data servlets comprises:

a subprocess for receiving said client request;

a subprocess for retrieving data from a database, wherein said retrieved data is located using said client request; and a subprocess for formatting said retrieved data into a first data stream; and one or more rendering servlets, wherein each of said rendering servlets comprises:

a subprocess for receiving said first data stream, responsive to a subprocess in any of said data servlets for sending said first data stream to one of said rendering servlets;

a subprocess for parsing said received first data stream;

a subprocess for formatting said parsed data into a second data stream; and a subprocess for returning said second data stream as a response to said client request.

2. Computer readable code for using serviets to isolate data retrieval from data presentation formatting according to claim 1, wherein said first data stream is formatted as an Extensible Markup Language (XML) data stream.

3. Computer readable code for using serviets to isolate data retrieval from data presentation formatting according to claim 1, wherein said second data stream is formatted as a HyperText Markup Language (HTML) data stream.

4. Computer readable code for using servlets to isolate data retrieval from data presentation formatting according to claim 3, wherein said subprocess for formatting said parsed data uses a style sheet.

5. Computer readable code for using servlets to isolate data retrieval from data presentation formatting according to claim 4, wherein said style sheet is an Extensible Style Language (XSL) style sheet.

6. Computer readable code for using servlets to isolate data retrieval from data presentation formatting according to claim 4, wherein said style sheet is a Cascading Style Sheet (CSS).

7. Computer readable code for using servlets to isolate data retrieval from data presentation formatting according to claim 1, wherein said subprocess for sending said first data stream is implemented using servlet chaining.

8. Computer readable code for using servlets to isolate data retrieval from data presentation formatting according to claim 1, wherein said servlets are Java servlets.

9. A system for using servlets to isolate data retrieval from data presentation formatting in a computing environment having a connection to a network, comprising:
   a client request;
   one or more data servlets, wherein each of said data servlets comprises:
      means for receiving said client request;
      means for retrieving data from a database, wherein said retrieved data is located using said client request; and
      means for formatting said retrieved data into a first data stream; and one or more rendering servlets, wherein each of said rendering servlets comprises:
         means for receiving said first data stream, responsive to means in any of said data servlets for sending said first data stream to one of said rendering servlets;
         means for parsing said received first data stream;
         means for formatting said parsed data into a second data stream; and
         means for returning said second data stream as a response to said client request.

10. The system for using servlets to isolate data retrieval from data presentation formatting according to claim 9, wherein said means for formatting said first data stream formats said first data stream as an Extensible Markup Language (XML) data stream.

11. The system for using servlets to isolate data retrieval from data presentation formatting according to claim 10, wherein said means for formatting said second data stream formats said second data stream as a HyperText Markup Language (HTML) data stream.

12. The system for using servlets to isolate data retrieval from data presentation formatting according to claim 11, wherein said means for formatting said parsed data uses a style sheet.

13. The system for using servlets to isolate data retrieval from data presentation formatting according to claim 12, wherein said style sheet is an Extensible Style Language (XSL) style sheet.

14. The system for using servlets to isolate data retrieval from data presentation formatting according to claim 12, wherein said style sheet is a Cascading Style Sheet (CSS).

15. The system for using servlets to isolate data retrieval from data presentation formatting according to claim 9, wherein said means for sending said first data stream is implemented using servlet chaining.

16. The system for using servlets to isolate data retrieval from data presentation formatting according to claim 9 or, wherein said servlets are Java servlets.

17. A method for using servlets to isolate data retrieval from data presentation formatting in a computing environment having a connection to a network, comprising the steps of:
   receiving a client request at a first of one or more data servlets;
   retrieving data from a database, wherein said retrieved data is located using said client request;
   formatting said retrieved data into a first data stream;
   sending said first data stream from said first data servlet to a first of one or more rendering servlets;
   receiving said first data stream at said first rendering servlet;
   parsing said received first data stream;
   formatting said parsed data into a second data stream; and
   returning said second data stream as a response to said client request.

18. The method for using servlets to isolate data retrieval from data presentation formatting according to claim 17, wherein said formatting said first data stream step formats said first data stream as an Extensible Markup Language (XML) data stream.

19. The method for using servlets to isolate data retrieval from data presentation formatting according to claim 18, wherein said formatting said second data stream step formats said second data stream as a HyperText Markup Language (HTML) data stream.

20. The method for using servlets to isolate data retrieval from data presentation formatting according to claim 19, wherein said formatting said parsed data step uses a style sheet.

21. The method for using servlets to isolate data retrieval from data presentation formatting according to claim 20, wherein said style sheet is an Extensible Style Language (XSL) style sheet.

22. The method for using servlets to isolate data retrieval from data presentation formatting according to claim 20, wherein said style sheet is a Cascading Style Sheet (CSS).

23. The method for using servlets to isolate data retrieval from data presentation formatting according to claim 17, wherein said sending said first data stream step is implemented using servlet chaining.

* * * * *